(No Model.)
J. E. CARLSON.
DRAFT EQUALIZER.
No. 444,877. Patented Jan. 20, 1891.
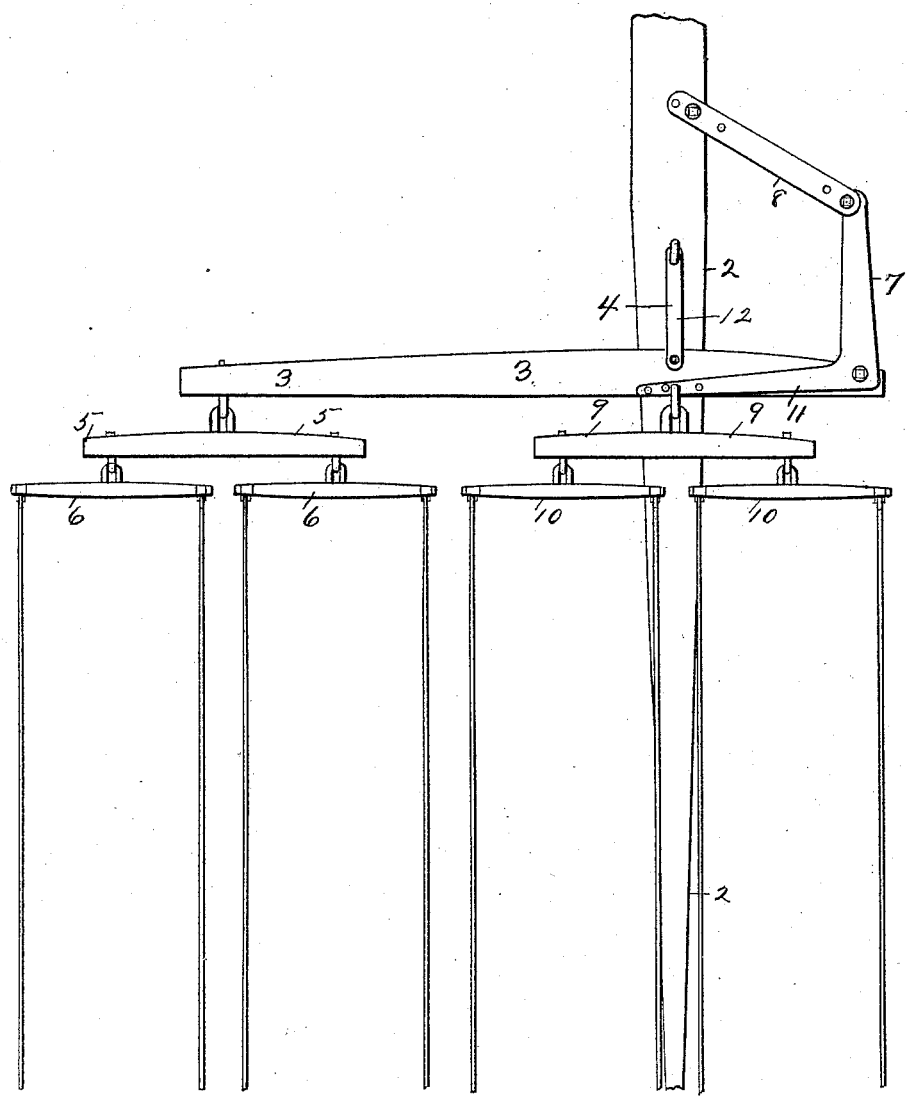
Witnesses.
A. O. Starr
A. Mac Welch
Inventor.
John E. Carlson
By Paul & Merwin Atty's.

UNITED STATES PATENT OFFICE.

JOHN E. CARLSON, OF APPLETON, MINNESOTA.

DRAFT-EQUALIZER.

SPECIFICATION forming part of Letters Patent No. 444,877, dated January 20, 1891.

Application filed June 9, 1890. Serial No. 354,727. (No model.)

*To all whom it may concern:*

Be it known that I, JOHN E. CARLSON, of Appleton, Swift county, Minnesota, have invented certain Improvements in Draft-Equalizers, of which the following is a specification.

My invention relates to attachments for the eveners and whiffletrees for the use of four horses abreast in connection with harvesters or similar vehicles, its object being to so connect the whiffletrees and eveners to the pole of the harvester as to distribute and equalize the draft for each horse where three of the animals are arranged upon one side of the pole and one horse upon the other.

My invention further consists in the construction and combination hereinafter described, and particularly pointed out in the claims.

In the drawing forming part of this specification, 2 represents the harvester tongue or pole; 3, a transverse evener-bar pivoted to the pole and secured by means of the strap 4 and pin 12 in the ordinary manner. The longer arm of the bar or lever is provided with an evener 5, attached thereto in the ordinary manner and carrying whiffletrees 6. At the other and shorter end of the evener-bar is pivoted the bell-crank lever 7, with one arm extending backward substantially parallel with the pole and the other 11 at substantially right angles with the first-named arm and with its end reaching to or over the center of the tongue. The rearwardly-extending arm of the lever 7 is connected to the tongue by the link 8, pivotally secured to both the lever and the tongue, the point of attachment to the tongue being back of the end of the lever, so that the link 8 forms an obtuse angle with the lever. To the transverse arm 11 of the lever 7 is attached the evener 9 in the same manner as the evener 5 is attached to the bar 3, and is provided with whiffletrees 10 in the ordinary manner—one on each side of the pole 2. By arranging a series of holes in the link 8 and in the transverse arm of the lever 7 the adjustment of the eveners with reference to each other may be accurately made. It will thus be seen that when power is applied to the two sets of whiffletrees 6 and 10 the strain upon the whiffletrees 6 tends to turn the shorter and opposite end of the bar 3 backward, and the link 8 will therefore throw the rearwardly-extending arm of the lever outward and the transverse arm backward in opposition to the force applied at the whiffletree 10. Conversely, the force applied to the whiffletrees 10 acts in opposition to the whiffletrees 6, tending to throw them back, and by suitable adjustment of the connections of the evener 9 with the transverse arm 11 of the lever 7 and of the link 8 with the pole equilibrium may be established between the eveners 5 and 9 and their whiffletrees.

While I have shown my improved device arranged for four horses, three on one side and one on the other of the pole, it is evident that by proper adjustment of the parts to each other it may be used for any number of horses where more are arranged on one side of the pole than the other, whereby the draft is equalized among them all, without departing from the principle of my invention.

I claim—

1. In a device of the class described, the combination, with the pole 2, of the evener-bar 3, pivoted thereto, the bell-crank lever 7, pivoted to the short arm of said bar and connected by means of the link 8 to said pole in the rear of said bar, the evener 5, connected to the other end of said bar, and the evener 9, connected to the transverse arm 11 of the bell-crank lever 7, substantially as and for the purposes set forth.

2. The combination, with the pole 2, the evener-bar 3, pivoted transversely thereof, the bell-crank lever 7, pivoted to one end of said bar, the link 8, pivotally connected to said pole and to one arm of said bell-crank lever, so as to form an obtuse angle with said arm, the evener 5, connected to the other end of said evener-bar, and the evener 9, connected to the transverse arm of said bell-crank lever, substantially as and for the purposes set forth.

3. In a device of the class described, the combination, with the pole of the vehicle, of a transverse evener-bar pivoted thereto, a bell-crank lever pivoted upon one end of said bar, having its rearwardly-extending arm diagonally linked to said pole, and eveners and their whiffletrees connected, respectively, to the other end of said evener-bar and the other arm of said bell-crank lever, substantially as and for the purposes set forth.

In testimony whereof I have hereunto set my hand this 5th day of June, 1890.

JOHN E. CARLSON.

In presence of—
H. HELSITH,
LUDVIG RING.